United States Patent
Lemke et al.

(10) Patent No.: US 11,585,941 B2
(45) Date of Patent: Feb. 21, 2023

(54) GNSS SATELLITE SPOOFING DETECTION USING MULTI-INDEPENDENT INERTIAL MIXING

(71) Applicant: Honeywell International Inc., Charlotte, NC (US)

(72) Inventors: Gary Duane Lemke, Andover, MN (US); Karl Abraham Keyzer, Minneapolis, MN (US); Mark A. Ahlbrecht, Minneapolis, MN (US); James Arthur McDonald, New Brighton, MN (US)

(73) Assignee: Honeywell International Inc., Charlotte, NC (US)

( * ) Notice: Subject to any disclaimer, the term of this patent is extended or adjusted under 35 U.S.C. 154(b) by 182 days.

(21) Appl. No.: 17/022,412

(22) Filed: Sep. 16, 2020

(65) Prior Publication Data
US 2022/0082704 A1 Mar. 17, 2022

(51) Int. Cl.
*G01S 19/21* (2010.01)
*G01S 19/10* (2010.01)
(Continued)

(52) U.S. Cl.
CPC ............ *G01S 19/215* (2013.01); *G01S 19/10* (2013.01); *G01S 19/20* (2013.01); *G01S 19/243* (2013.01); *G01S 19/41* (2013.01)

(58) Field of Classification Search
CPC .................................................... G01S 19/215
See application file for complete search history.

(56) References Cited

U.S. PATENT DOCUMENTS 5,563,786 A * 10/1996 Torii .................... G05D 1/0278
701/469
7,724,184 B2   5/2010 Waid
(Continued)

FOREIGN PATENT DOCUMENTS

| EP | 3109670 A1 | 12/2016 |
| KR | 101580053 B1 | 12/2015 |
| KR | 1020180134346 A | 12/2018 |

OTHER PUBLICATIONS

"Uncoupled Accelerometer Based GNSS Spoof Detection for Automobiles Using Statistic and Wavelet Based Tests", Neish Andrew et al.—Sep. 28, 2018 (Year: 2018).*
(Continued)

*Primary Examiner* — Erin F Heard
*Assistant Examiner* — Hailey R Le
(74) *Attorney, Agent, or Firm* — Fogg & Powers LLC

(57) ABSTRACT

Techniques for detecting GNSS spoofing using inertial mixing data are disclosed. One or more navigation parameters are determined by at least one GNSS receiver and a plurality of IRS from at least two periods of time. The navigation parameters from the GNSS receiver(s) and the IRS are compared at each time period, and the difference(s) between the compared navigation parameters are further compared to generate at least one differential value. A system can detect GNSS spoofing by comparing the at least one differential value to a suitable threshold. In one aspect each IRS navigation parameter is compared with a corresponding GNSS navigation parameter, wherein the plurality of differential values is mixed before threshold comparison. In another aspect, each IRS navigation parameter is mixed before comparison with a GNSS navigation parameter, and the resulting differential value is then compared against a threshold.

20 Claims, 6 Drawing Sheets

(51) Int. Cl.
*G01S 19/20* (2010.01)
*G01S 19/24* (2010.01)
*G01S 19/41* (2010.01)

(56) References Cited

U.S. PATENT DOCUMENTS

| | | | |
|---|---|---|---|
| 10,094,930 | B2 | 10/2018 | Schipper et al. |
| 10,466,700 | B1 | 11/2019 | Carmack et al. |
| 2007/0194984 | A1 | 8/2007 | Waid |
| 2014/0232592 | A1* | 8/2014 | Psiaki .................. G01C 21/28 342/357.25 |
| 2014/0354477 | A1* | 12/2014 | Robinson ............... G01S 19/48 342/357.78 |
| 2018/0152282 | A1* | 5/2018 | Choi ..................... H03K 5/133 |
| 2019/0243002 | A1 | 8/2019 | Song |
| 2020/0198645 | A1* | 6/2020 | Boer ..................... B60W 10/18 |

OTHER PUBLICATIONS

"Above Us Only Stars Exposing GPS Spoofing in Russia and Syria", C4ADS Innovation for Peace, at least as early as Mar. 25, 2019, pp. 1-66, C4ADS, www.c4ads.org.
"GNSS Interference", Safety first #29, Sep. 2019, pp. 1 through 8, Airbus S.A.S.
"Spoofing GNSS—From fiction to everyday fact", at least as early as Apr. 3, 2019, pp. 1 through 43, C4ADS innovation for peace, Resilient Navigation and Timing Foundation.
Broumandan et al., "Spoofing Detection Using GNSS/INS/Odometer Coupling for Vehicular Navigation", Sensors 2018, Apr. 24, 2018, pp. 1-18, MDPI, www.mdpi.com.
Clark, "Towards Updated Standards for GNSS Interference", Presented to IGWG-20, Jun. 19, 2019, pp. 1-17, Federal Aviation Administration.
Tanil et al., "An INS Monitor to Detect GNSS Spoofers Capable of Tracking Vehicle Position", IEEE Transactions on Aerospace and Electronic Systems, Feb. 2018, pp. 131 through 143, vol. 54, No. 1, IEEE.
Tanil et al., "Experimental Validation of INS Monitor against GNSS Spoofing", at least as early as Oct. 7, 2018, pp. 1 through 15.
European Patent Office, "Extended European Search Report from EP Application No. 21195395.5", from Foreign Counterpart to U.S. Appl. No. 17/022,412, dated Mar. 21, 2022, pp. 1 through 10, Published: EP.
Neish, et al., "Uncoupled Accelerometer Based GNSS Spoof Detection for Automobiles using Statistic and Wavelet Based Tests", 31st International Technical Meeting of the Satellite Division of the Institute of Navigation (ION GNSS+ 2018), Miami, FL, Sep. 24-28, 2018, pp. 2938 through 2962.

* cited by examiner

GNSS SATELLITE SPOOFING DETECTION USING MULTI-INDEPENDENT INERTIAL MIXING

BACKGROUND

The globalization of international commerce has led to an increased reliance on air travel to satisfy the demands of market expectations. Aircraft are expected to undergo flights of longer duration through varied environmental conditions, which ultimately requires aircraft to depend on some sort of navigation technology to guide the aircraft safely to its destination. Among the available navigational tools, Global Navigation Satellite Systems (GNSS) technology has proven to be an effective means for aircraft navigation, and today GNSS technology is ubiquitously found in aircraft navigational systems.

Recent events, however, have called into question the reliability of GNSS navigational aids. Although GNSS technology provides navigation data with a high degree of accuracy, it nonetheless remains susceptible to external manipulation. One such form of manipulation, known as GNSS "spoofing", occurs when GNSS signals are altered before they are received by a GNSS receiver. As a result, the GNSS receiver extrapolates incorrect navigation information of the aircraft, e.g., position, based on the manipulated signals. Without techniques for identifying when GNSS signals have been spoofed, an aircraft may detrimentally rely on false navigation information at its peril. Left unchecked, GNSS spoofing attacks thus present a severe risk to aircraft integrity and the safety of its passengers and crew.

Therefore, a need exists for an improved means for detecting whether received GNSS signals have been spoofed.

SUMMARY

In one embodiment, a method is provided. The method comprises acquiring a first navigation parameter measurement corresponding to a vehicle from a Global Navigation Satellite System (GNSS) receiver. The method further comprises acquiring a plurality of navigation parameter measurements corresponding to the vehicle from a plurality of inertial reference systems (IRS). Additionally, the method further comprises determining at least one differential value based on a rate of change of a difference between the first navigation parameter measurement and at least one of the plurality of navigation parameter measurements for at least two points in time. The method also includes comparing the at least one differential value to a threshold value, wherein the threshold value is indicative of GNSS spoofing with respect to the vehicle.

In another embodiment, a system is provided. The system comprises at least one GNSS receiver, wherein the at least one GNSS receiver is configured to acquire a first navigation parameter measurement corresponding to a vehicle based on received GNSS signals. The system further comprises a plurality of inertial reference systems (IRS), wherein the plurality of IRS is configured to acquire a plurality of navigation parameter measurements. Additionally, the system comprises a processing system comprising one or more processors, wherein the processing system is coupled to the GNSS receiver and the plurality of IRS. The processing system is configured to acquire the first navigation parameter measurement and the plurality of navigation parameter measurements. The processing system also determines at least one differential value based on a rate of change of a difference between a first navigation parameter measurement and at least one of the plurality of navigation parameter measurements for at least two points in time. The processing system also compares the at least one differential value to a threshold value, wherein the threshold value is indicative of GNSS spoofing with respect to the vehicle.

In yet another embodiment, a non-transitory computer-readable medium is provided. The non-transitory computer-readable medium includes computer-executable instructions stored thereon which, when executed by one or more processors, cause the one or more processors to acquire a first navigation parameter measurement corresponding to a Global Navigation Satellite System (GNSS) receiver. The instructions further cause the one or more processors to acquire a plurality of navigation parameter measurements corresponding to a plurality of inertial reference systems (IRS). Additionally, the instructions cause the one or more processors to determine at least one differential value based on a rate of change of a difference between a first navigation parameter measurement and at least one of the plurality of navigation parameter measurements for at least two points in time. The instructions further cause the one or more processors to compare the at least one differential value to a threshold value, wherein the threshold value is indicative of GNSS spoofing with respect to a vehicle.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

BRIEF DESCRIPTION OF THE DRAWINGS

Exemplary features of the present disclosure, its nature and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

Figure 1:
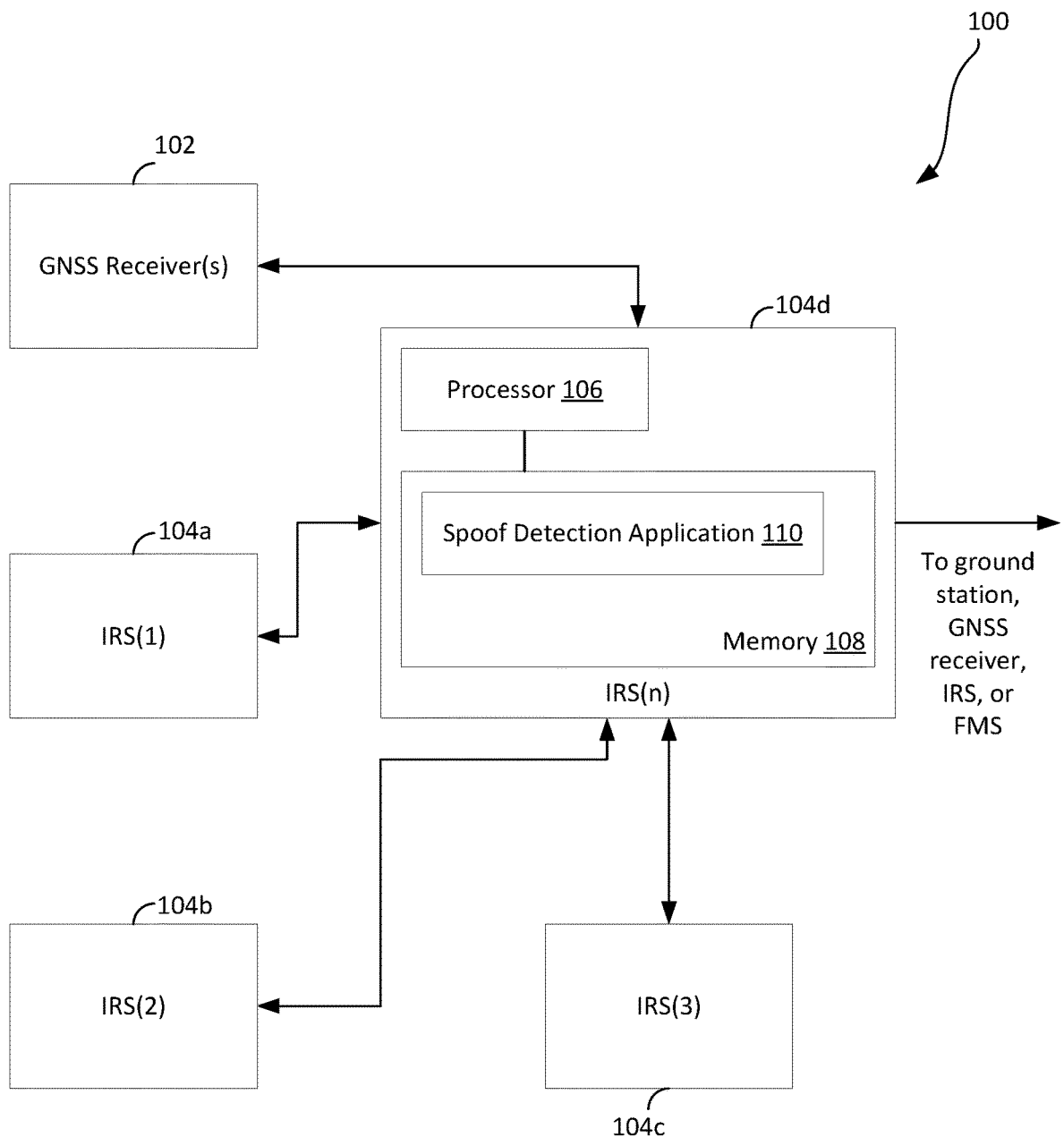
FIG. 1 illustrates a block diagram depicting one example of a system that includes an inertial reference system configured for detecting GNSS spoofing based on received GNSS and inertial data.

In accordance with common practice, the various described features are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The following disclosure is directed to techniques for detecting GNSS spoofing by comparing received GNSS data to corresponding data mixed from a plurality of inertial reference systems (IRS). Several types of navigation data, referred to herein as navigation parameters, are compared. In various embodiments, the navigation parameters, defined below, can include any one of velocity, groundspeed, position, track angle, or flight path angle measurements. Furthermore, navigation parameters from a plurality of IRS may be mixed as defined below prior to comparison with GNSS data or may each be compared separately against GNSS navigation parameters before they are combined and compared to a threshold indicative of GNSS spoofing. The mixing of independent IRS navigation parameters to compare with GNSS acquired navigation parameters enables for an improved and more reliable means of detecting spoofed GNSS signals, thereby reducing the deleterious impact of spoofing events on vehicle travel.

GNSS spoofing can be detected in greater detail as follows. A navigation parameter measurement, for example a velocity measurement of a vehicle, is acquired from a GNSS receiver that is coupled to the vehicle. A plurality of corresponding navigation parameter measurements, e.g., velocity measurements, are also acquired in parallel from a plurality of IRS, where each IRS is configured to measure a navigation parameter. Thus, the number of navigation parameters measured from the IRS will correspond to the number of independent IRS.

How the navigation parameters measured by the IRS are used to detect whether GNSS spoofing has occurred depends on the embodiment. At a broad level, the techniques described herein determine at least one differential value that is based on a comparison between the GNSS navigation parameter measurement and at least one of the IRS navigation parameters. The one or more differential values are then compared to a threshold to determine whether GNSS spoofing has occurred. If yes, an appropriate output can be issued, for example, an alert to various systems and devices onboard the vehicle the GNSS signals have been spoofed.

In some embodiments, the navigation parameter determined by the GNSS receiver is compared with each IRS navigation parameter measurement. That is, each IRS navigation parameter is separately analyzed with the GNSS navigation parameter measurement independent of the other IRS navigation parameter measurements. For each IRS, the respective navigation parameter is combined with the GNSS navigation parameter to generate a difference between the two parameters. This difference corresponds to the difference in value between the magnitude of the GNSS navigation parameter signal and the magnitude of the IRS navigation parameter signal.

However, this difference is not directly compared against a threshold to determine spoofing. Instead, a differential value is determined by comparing the difference at a first time period and the same signal difference at a later time period. The differential value thus represents the rate of change between the GNSS navigation parameter signal and that of the IRS navigation parameter signal between the two time periods. As described in further detail below, a large disparity between these two measurements (a large differential value) corresponds to spoofed GNSS measurements. A differential signal is determined for each IRS navigation parameter measurement.

Once each of the differential values corresponding to each IRS navigation parameter measurement are obtained, they are combined, e.g., by averaging the signals. This combined differential signal is compared against a threshold value, which is appropriately selected to determine whether GNSS spoofing has occurred with respect to the GNSS signals used to determine the GNSS navigation parameter.

In other embodiments, the IRS navigation parameters are combined before they are compared with the GNSS navigation parameter. This generates a signal representing the combined IRS navigation parameter measurements. Then, the combined signal is compared with the GNSS navigation parameter measurement to generate a differential value, which is used to compare against a threshold indicative of GNSS spoofing as described above. In these embodiments, the IRS navigation parameter measurements are mixed before comparison with a GNSS navigation parameter measurement as opposed to after comparison.

The following terms are relevant for purposes of this disclosure. As used herein, the term "navigation parameter" (or alternatively "navigation parameter measurement") refers to a quantity (e.g., measurement) determined about a vehicle that relates to its location, movement, or orientation. Navigation parameter measurements can include (but not limited to) "velocity", "position", "track angle", "flight path angle", "groundspeed", or vector components thereof. The term "track angle" means the course of a vehicle over the ground, relative to a direction such as North. Furthermore, the term "flight path angle" means the angle formed by the velocity vector of a vehicle and the horizontal plane of a coordinate reference system. Additionally, the term "groundspeed" means the speed of the vehicle if the vehicle were traveling on the ground; that is, the speed of the vehicle in flight corrected for impacts due to airspeed. Lastly, the term "mixed IRS navigation parameters" means a combination of at least two IRS navigation parameter measurements. Any term not expressly defined is meant to convey its ordinary meaning as understood by one having ordinary skill in the art.

Referring to the Figures, FIG. 1 illustrates a system 100 configured to detect GNSS spoofing based on received GNSS navigation data. One or more GNSS receivers 102 configured to receive GNSS signals from a satellite constellation are coupled to a vehicle (not shown). Use of the term "vehicle" is not intended to be limiting and includes all classes of vehicles falling within the ordinary meaning of the term. This would include but not limited to, aerial traversing vehicles (e.g., commercial, non-commercial, or recreational aircraft), unmanned and/or space traversing vehicles (e.g., satellites, urban air mobility vehicles), water traversing vehicles (e.g., ships, submarines), and land traversing vehicles (e.g., automobiles including cars, trucks, motorcycles). Throughout the disclosure, the vehicle may be further illustrated as an aircraft with the understanding that the principles described herein apply to other vehicles where applicable.

GNSS receiver 102 can be coupled to the vehicle, whether physically (e.g., inside or mounted to the vehicle), electrically, or communicatively (e.g., via a network device operated with or without a user). A network device may include a personal computing system, laptop, tablet, phone, personal digital assistant, or other such device operable to establish a connection to a network. Thus, a GNSS receiver may be physically separated from the body of the vehicle, for instance with an independent device, and still provide GNSS signals about a position of the corresponding vehicle, such as via a network device used by an individual inside the vehicle (e.g., a laptop configured with a GNSS receiver used by the pilot or flight crew).

GNSS receiver 102 can operate via any known global or regional based satellite system, including the Global Positioning System (GPS), Galileo, Beidou, or Globalnaya Navigatsionnaya Sputnikovaya Sistema (GLONASS) systems. Based on received GNSS signals, GNSS receiver 102 can be configured to determine one or more navigation parameter measurements, including but not limited to, position, velocity, groundspeed, and/or track angle measurements of the vehicle based on the GNSS signals. Where navigation parameters can be represented as a vector quantity, for example velocity, they can be represented as a two or three-dimensional vector quantity with reference to a coordinate system (e.g., a Cartesian coordinate system). In addition, vector components of navigation parameters can be individually measured. For instance, vehicle attitude in the y-direction of a Cartesian coordinate system can be measured from an IRS. Navigation parameters may optionally be represented as a scalar quantity, such as groundspeed.

In cases where GNSS receiver 102 does not determine a navigation parameter measurement based on received GNSS signals, GNSS receiver 102 can send its data to an external processing system, for example IRS 104d, to determine the appropriate navigational parameter measurement. For instance, GNSS receiver 102 may not be configured to determine a flight path angle from the GNSS signals, in which case data may be sent to, e.g., IRS 104d, to determine the flight path angle.

More than one GNSS receiver 102 may optionally be coupled to the vehicle. For example, a vehicle may make use of a primary and a secondary GNSS receiver 102. In these embodiments, IRS 104a-d may be configured such that some IRS may analyze a GNSS navigation parameter generated by the primary GNSS receiver (for example, IRS 104a-b) while the remaining IRS may analyze a GNSS navigation parameter generated by the secondary GNSS receiver. Although one GNSS receiver 102 is described for pedagogical reasons, one skilled in the art will recognize that the techniques described below, including systems 100 and 200, may be adapted for use with multiple GNSS receivers where applicable.

In addition to GNSS receiver 102, system 100 further includes IRS 104a-d, which are each configured to determine a navigation parameter. Each IRS may include any number or combination of gyroscopes (e.g., ring laser gyroscopes, micro-electrical-mechanical-systems gyroscopes), accelerometers, or magnetometers configured to measure a velocity or acceleration of the vehicle. In addition, each IRS may also include processing circuitry for determining various navigation parameters based on the velocity or acceleration measurements. For example, each IRS 104a-d may be configured to determine a flight path angle based on the measured velocity. In some embodiments, IRS 104a-d can also determine a position solution based on inertial and/or GNSS measurements by analytical techniques such as least-squares regression or a Kalman filter. Although system 100 includes four IRS, the number of IRS can be modified based on the needs of the system. That is, system 100 can include any number, n, of IRS(n). Preferably, system 100 includes at least two IRS.

IRS 104a-d in system 100 can be configured to have different priority configurations, where one IRS acts as the primary IRS and the remaining IRS act as secondary systems. As illustrated in FIG. 1, IRS 104d is configured to be the primary IRS, where it can receive and process data from GNSS receiver 102 and the secondary IRS 104a-c. In embodiments where system 100 includes more than one GNSS receiver 102, an IRS can be designated the primary IRS with respect to a particular GNSS receiver, such that the IRS can be configured to process navigation parameters, determine the presence of spoofing, and communicate an output based on data received by the respective GNSS. Thus, each GNSS receiver can be associated with a primary IRS, which may the same IRS for each GNSS receiver or may be selected in different IRS units. System 100 illustrates one primary IRS 104d for pedagogical reasons.

The primary IRS, e.g., IRS 104d, can also implement circuitry configured to detect GNSS spoofing from data received by GNSS receiver 102 and send an output that indicates whether GNSS spoofing has occurred to other systems of the vehicle. More specifically, IRS 104d includes processor 106 which can execute the instructions of spoof detection application 110 for detecting GNSS spoofing as described in further detail below with reference to FIGS. 3-4. In such embodiments, processing circuitry can be integrated into one or more IRS, in which the processing functions described herein (e.g., via processor 106) can be implemented in an IRS. Processor 106 may include any one or combination of processors, microprocessors, digital signal processors, application specific integrated circuits, field programmable gate arrays, and/or other similar variants thereof. Processor 106 may also include, or function with, software programs, firmware, or other computer readable instructions for carrying out various process tasks, calculations, and control functions, used in the methods described below. These instructions are typically tangibly embodied on any non-transitory storage media (or computer readable media) used for storage of computer readable instructions or data structures.

Such storage media can include memory 108 coupled to processor 106, which stores the instructions of spoof detection application 110. Memory 108 can be implemented with any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. Memory 108 may also include one or more database to store acquired processing data.

Once IRS 104d determines whether GNSS spoofing is present, it can produce an output indicating this result to other systems or devices onboard or external to the vehicle. For example, IRS 104d can be configured to send an output to a flight management system (FMS) located in the cockpit of the vehicle, which can include an alert to the pilot or other passengers of the vehicle that GNSS spoofing is detected and that the integrity of the affected receiver(s) is compromised. IRS 104d may also send a similar output to a ground station e.g., via a ground warning system, notifying the station of the spoofing result and that the vehicle is not currently able to rely on GNSS technology.

Alerts can also be sent within system 100 itself. For instance, IRS 104d can issue an alert to any of IRS 104a-d to stop using GNSS signals as navigation aids, e.g., by discarding spoofed signals input into the Kalman filter. Additionally, or alternatively, IRS 104d can issue an alert to GNSS receiver 102 informing it of the spoofing result and directing GNSS receiver 102 to issue an invalidity signal. As a result of a positive spoofing determination, system 100 can also switch to one or more additional position determining systems to use for determining the position of the vehicle, if such systems are available.

Figure 2:
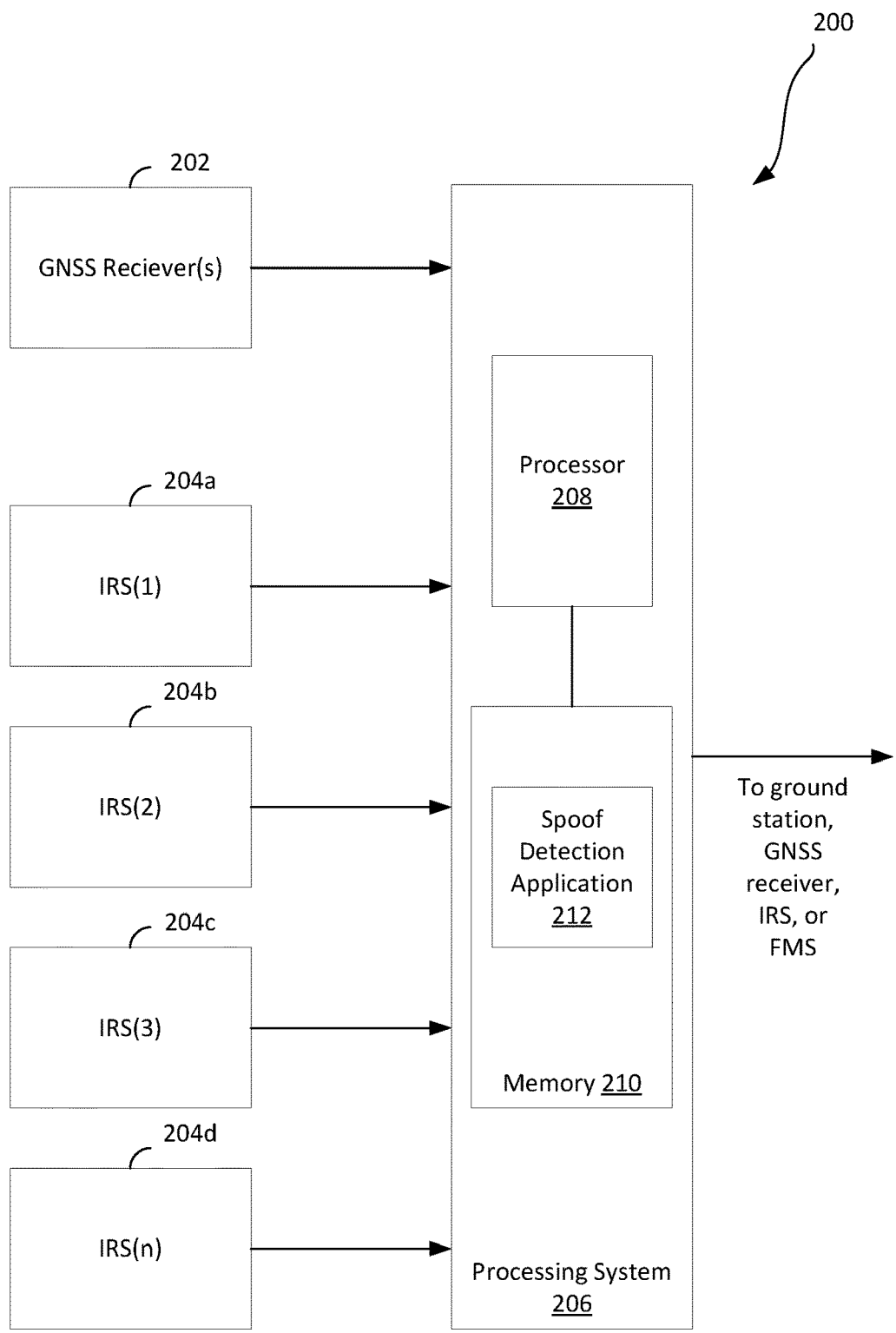
FIG. 2 illustrates a block diagram depicting one example of a system that includes an external processing system configured for detecting GNSS spoofing based on received GNSS and inertial data.

Alternatively, navigation parameters determined from GNSS receiver 102 or IRS 104a-d may be sent to one or more external processing systems to detect whether GNSS spoofing has occurred, of which an example is shown in FIG. 2. System 200 includes an alternative system architecture for detecting GNSS spoofing, including processing system 206. Similar to system 100, system 200 includes one or more GNSS receivers 202 and a plurality of IRS 204a-d.

In contrast to system 100, each of the IRS 204a-d are not configured to detect spoofing. That is, there is no priority configuration between the IRS 204a-d where one IRS acts as the primary IRS that can determine whether spoofing has occurred and send an appropriate output as described above. Instead, system 200 processes navigation parameter measurements and determines spoofing via an external analyzer, illustrated as processing system 206. Processing system 206 includes processor 208 coupled to memory 210, of which processor 208 can execute the instructions of spoof detection application 212 stored in memory 210 as described above. To detect GNSS spoofing, processing system 206 receives navigation parameter measurements from GNSS receiver(s) 202 and IRS 204a-d and determines spoofing based on the received navigation parameters. When spoofing has been detected, processing system 206 can issue an output indicating that GNSS spoofing is present to other external systems, GNSS receiver 202, and/or IRS 204a-d as described above.

Figure 3:
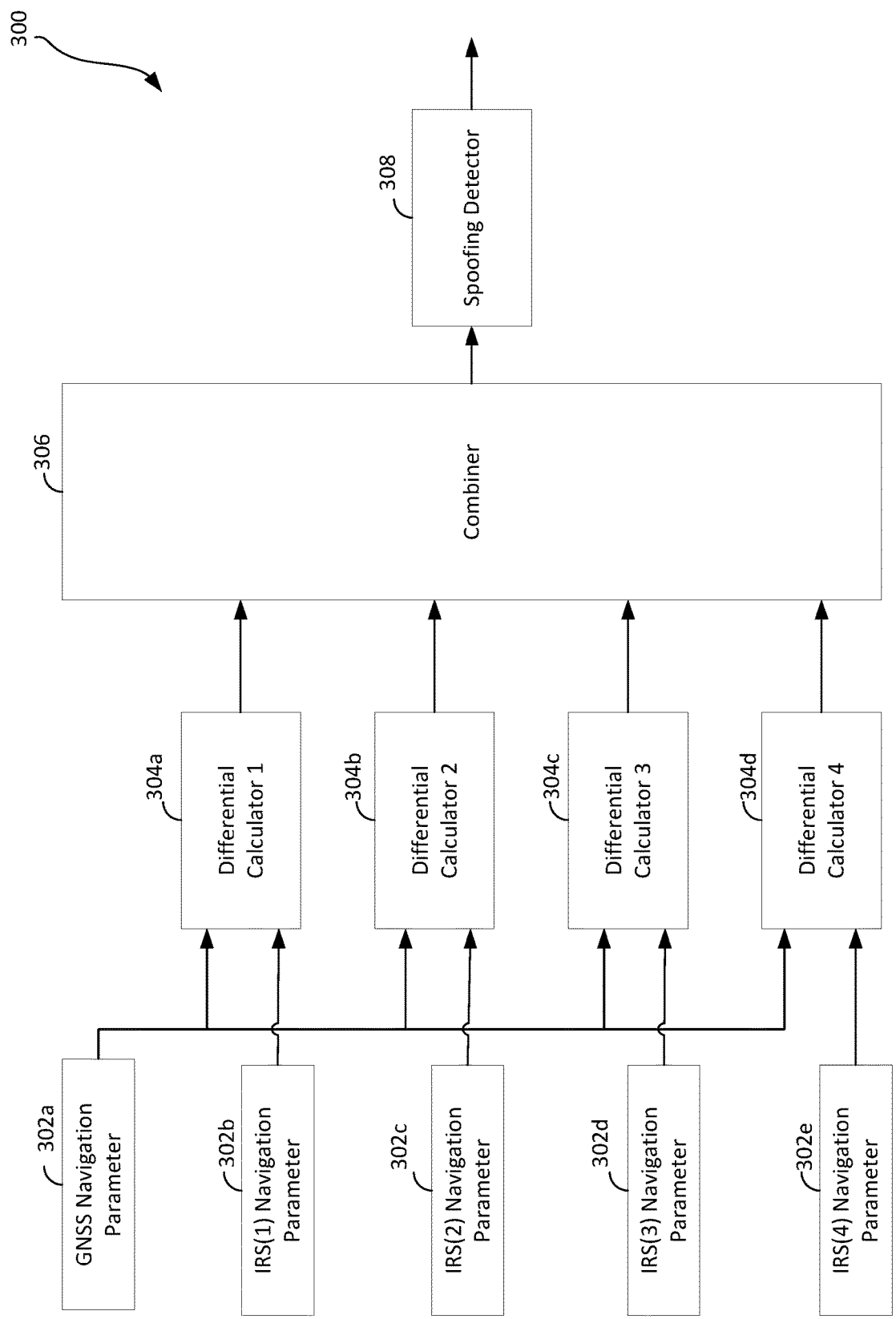
FIG. 3 illustrates a block diagram depicting one example of a data flow diagram for spoofing detection by comparing GNSS data to a plurality of inertial reference system measurements.

FIG. 3 illustrates a flow chart of an example data flow diagram to determine GNSS spoofing. Data flow logic 300 can be implemented in either systems 100 or 200 e.g., by spoof detection application 110 or 212, but may be implemented via other techniques as well.

Navigation parameter measurements are acquired at blocks 302a-e, with at least one navigation parameter measurement acquired by a GNSS receiver (block 302a) and the remaining navigation parameter measurements acquired by a plurality of IRS (blocks 302b-e). Four IRS navigation parameter measurements 302b-e are shown in diagram 300 for pedagogical reasons. For ease of explanation, the navigation parameter measurements acquired in blocks 302a and blocks 302b-e are referred to velocity measurements of a vehicle with the understanding that other types of measurements can be included as well, for example, position, groundspeed, track angle, and flight path angle.

At differential calculator blocks 304a-d, a differential value is acquired with respect to each of the IRS velocity measurements. The differential value corresponds to a rate of change between the GNSS velocity measurement and the respective IRS velocity measurement between two time periods. At a first time period, a first difference (difference 1) is determined between the absolute value of the GNSS velocity measurement and the respective IRS velocity measurement. At a later time period, a second difference (difference 2) is then determined between the GNSS velocity measurement and the respective IRS velocity measurement. The difference between difference 2 and difference 1 is the differential value that corresponds to each IRS velocity measurement. For example, differential calculator 1 at block 304a determines the differential value with respect to the GNSS navigation parameter measurement 302a and the IRS(1) navigation parameter measurement 302b, while differential calculator 2 at block 304b determines the differential value with respect to the GNSS navigation parameter measurement 302a and the IRS(2) navigation parameter measurement 302b. Thus, as the number of IRS navigation parameters increase, so too will the number of differential calculators needed to determine respective differential values.

The differential values obtained in blocks 304a-d can be used to detect whether the GNSS measurements have been spoofed via comparison with the IRS measurements. Specifically, an IRS can determine a navigation parameter independent from GNSS technology, meaning that as the vehicle moves through space, a GNSS receiver can determine the velocity simultaneously and independently from the IRS. If the GNSS has not been spoofed, then there will not be a difference between the GNSS velocity and the IRS velocity at a particular time, or there will be a small difference that corresponds to measurement error in acquiring the velocity measurements (as opposed to external manipulation).

While a direct comparison of a GNSS and IRS measurements at e.g., the first time period can detect spoofing, observed differences between a time interval can provide an improved technique for spoofing detection. That is, spoofing can also be detected based on observing the differences between the GNSS and IRS measurements over a given time period. Regardless of how the vehicle changes speed during that time interval, the differences between the GNSS and IRS measurements should remain constant. In that case, a differential value observed from the first and second time periods should be zero, because the GNSS receiver and IRS are determining approximately the same velocities at those time periods.

When spoofing is present, however, the differential value between the GNSS and IRS measurements will be substantial, because the GNSS receiver will record different e.g., velocity measurements from the IRS due to the manipulation of GNSS signals received by the GNSS receiver. Since the GNSS determines navigation parameters (velocity) based on a position solution generated by GNSS signals, the difference between a velocity determined using spoofed GNSS signals and a non-spoofed IRS velocity will ordinarily increase over time. Thus, observing the change of GNSS velocity relative to the IRS velocity over a given time period can provide a useful indicator of GNSS spoofing.

Once each differential value has been determined, each differential value is sent to combiner 306, which is configured to combine the differential values based on various techniques. In some embodiments, the differential values can be combined by averaging the differential values. In other embodiments, combining can be accomplished by determining the median of all the differential values. Alternatively, combining the differential values can include determining a weighted mean based on the quality of the sensors used to acquire the velocity measurements. For example, if the IRS differ in quality, the differential value can be assigned a weighting value based on the quality of the respective IRS used to determine the corresponding velocity measurements. In this embodiment, a differential value based on a higher quality IRS can be given a larger weighting value than a differential value that is based on a lower quality IRS. In additional or alternative embodiments, the differential values can be weighted based also on the quality of the GNSS receiver, particularly if more than one GNSS receiver is used. Combiner 306 thus outputs a combined differential value that reflects the navigation parameters of each of the GNSS receiver and the plurality of IRS.

At block 308, the combined differential value is compared against a threshold value to determine whether GNSS spoofing is present. Thus, the threshold value should be set where a combined differential value that is greater than the threshold value indicates that the GNSS measurements have been spoofed. A variety of factors can be considered both in determining the format of the differential value and in determining the threshold value.

For instance, the navigation parameter can be represented as a vector quantity in some embodiments, as in the case for velocity or track angle. The threshold value can therefore be set so that spoofing can be detected if any of the vector components (e.g., x, y, or z components), or a set of vector components (e.g., x-y or y-z components) exceed the threshold value. This can be useful in cases where only a particular subset of velocity components is important, for example, if the vehicle travels primarily in the horizontal direction (e.g., x-y coordinate plane). Alternatively, the magnitude of the navigation parameter (e.g., magnitude of the velocity vector) can be compared to the threshold value.

Setting the threshold value can be done either statically, by predefined thresholds, or computed dynamically. In some embodiments, the threshold value can be set as a function of the integrity and/or accuracy of the GNSS measurements. The integrity of the GNSS measurements can be provided by the horizontal integrity level (HIL) and vertical integrity level (VIL), and the accuracy is provided by the horizontal figure of merit (HFOM) and vertical figure of merit (VFOM). A differential value that exceeds the confidence parameters defined by the statistical technique can thus determine whether GNSS spoofing is present.

Figure 4:
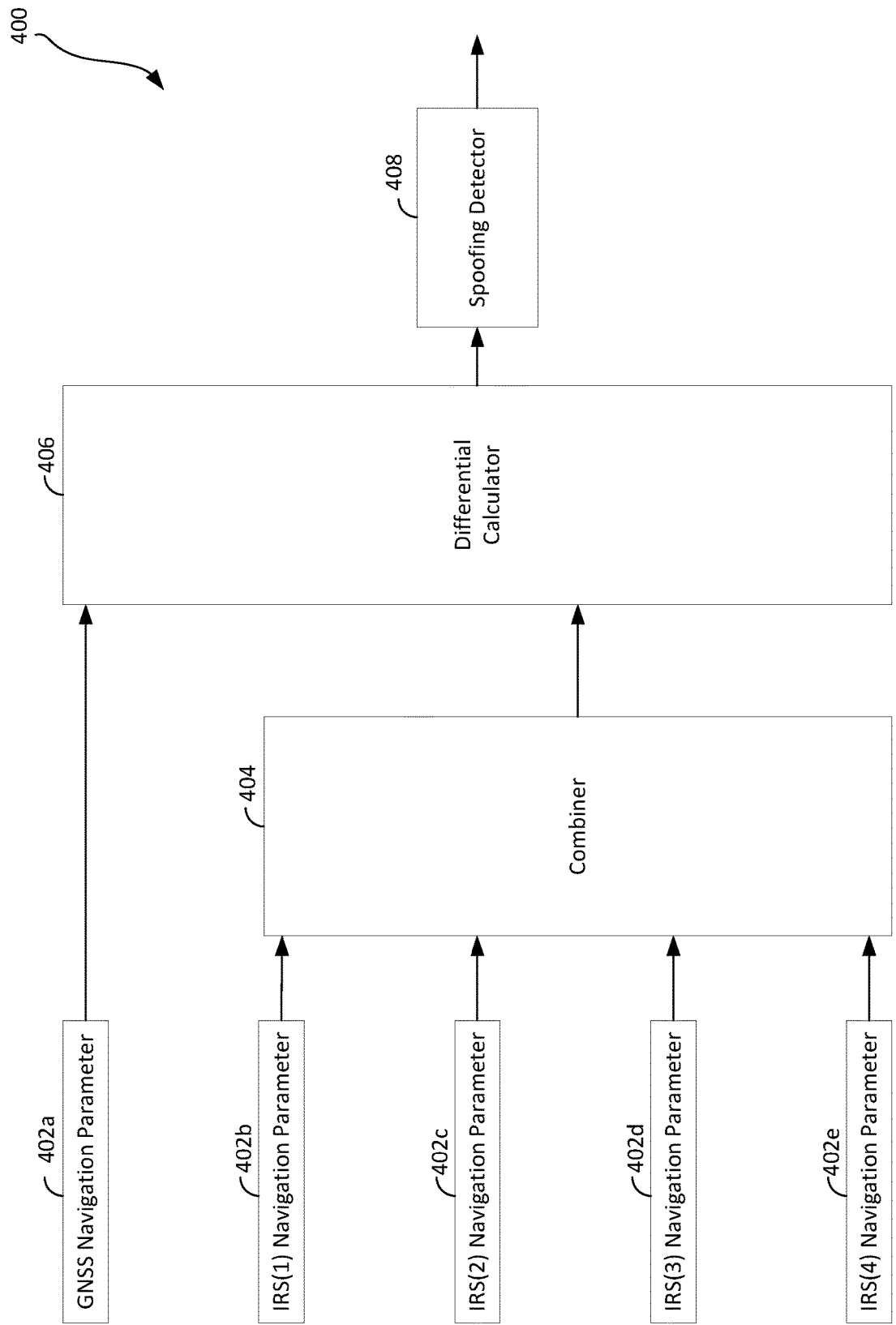
FIG. 4 illustrates a block diagram depicting one example of a data flow diagram for spoofing detection by comparing GNSS data to a combined set of inertial reference system measurements.

Referring to FIG. 4, an alternative data flow diagram for detecting GNSS spoofing is illustrated. Similar to data flow logic 300, data flow logic 400 can be implemented via either systems 100 or 200 via spoof detection application 110 or 212 but may be implemented via other techniques as well.

At blocks 402*a-e* navigation parameter measurements e.g., velocities are acquired by a GNSS receiver (shown in block 402*a*) and from a plurality of IRS (shown in blocks 402*b-e*). In contrast to data flow logic 300, data flow logic 400 combines the IRS navigation parameter measurements in block 404 before they are compared with the GNSS navigation parameter measurement. The IRS navigation parameter measurements can be combined using the same techniques as described with respect to data flow logic 300.

At differential calculator 406, the combined IRS navigation parameter measurements are received along with the GNSS navigation parameter measurement 402*a*. Here, a single differential value is determined between the GNSS navigation parameter measurement 402*a* and the combined IRS navigation parameter measurements. Once the differential value has been determined, the differential value is compared against a threshold at spoofing detector 408 to determine whether GNSS spoofing is present.

Figure 5:
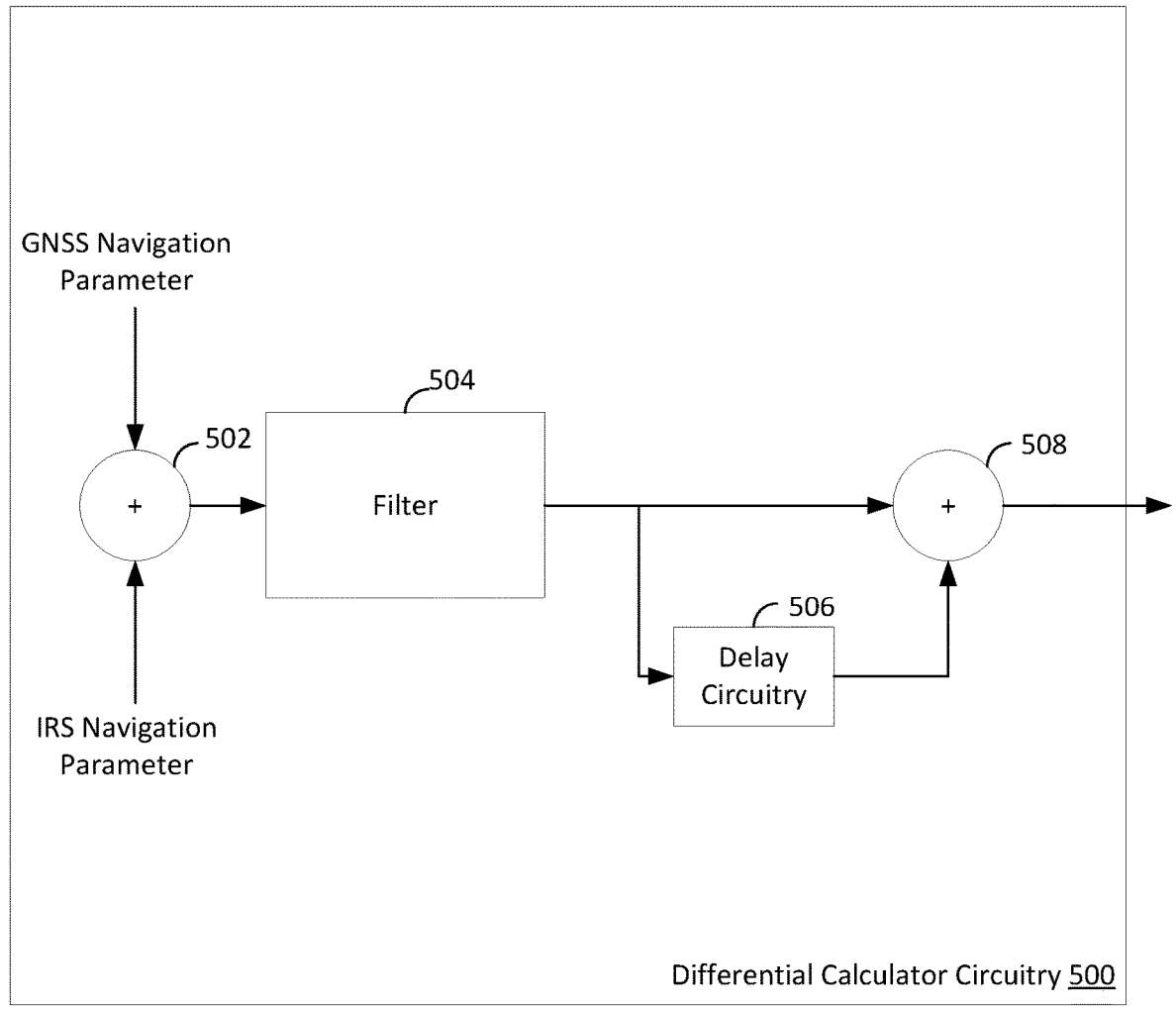
FIG. 5 illustrates a block diagram depicting one example of circuitry configured to determine a differential value between GNSS data and inertial data.

FIG. 5 illustrates example circuitry configured to determine a differential value based on received GNSS navigation parameter and IRS navigation parameter measurements. Differential calculator circuitry 500 can be implemented in either of the systems described in FIGS. 1 and 2, and may determine a differential value based on either of the two processes described in FIGS. 3 and 4. That is differential calculator circuitry 500 can be integrated, for example, in IRS 104*d* or processing system 206 (via processors 106 and 208), and can be modified to determine a differential value based on any of differential calculators 304*a-d* or differential calculator 406.

Differential calculator circuitry 500 receives a GNSS navigation parameter measurement in addition to an IRS navigation parameter measurement. If data flow logic 300 is used to detect GNSS spoofing, then differential calculator circuitry 500 receives an IRS navigation parameter measurement that corresponds to a single IRS; if data flow logic 400 is implemented, differential calculator circuitry 500 receives a combined IRS navigation parameter measurement that corresponds to each of the plurality of IRS. Each navigation parameter measurement is received at combiner 502. In some embodiments, combiner 502 can comprise a summer. To determine a difference between the GNSS and IRS navigation parameters, the signals can be set to opposite polarities (+/−), in which case combiner 502 can output the difference in value between the two signals.

Filter 504 then receives the combined signal. Filter 504 processes the signal by removing noise and other imperfections present in the combined signal. In some embodiments, filter 504 can include a low pass filter which is configured to remove high-frequency noise components from the combined signal. Alternatively, filter 504 can include an averaging filter.

The filtered signal is then split, with one portion input into combiner 508 with the other input at delay circuitry 506. The filtered signal is split in order to compare the signal at two different time periods. One portion of the signal proceeds directly from filter 504 to combiner 508, which corresponds to the difference between the GNSS navigation parameter and the IRS navigation parameter measurements at a first time period. The second portion then enters delay circuitry 506, which is configured to delay the combined signal for a designated time period. In some embodiments, this delay can last for a minute or longer. However, one skilled in the art can modify the length of the delay such that it delays the combined signal for a desired time interval. Delay circuitry 500 can include a combination of resistors, capacitors, and/or transistors to achieve the designated time period delay.

The delayed signal then enters the second input of combiner 508, which corresponds to the difference between the GNSS navigation parameter and the IRS navigation parameter at a second time period. Combiner 508 then determines the difference between the two signals, which corresponds to the differential value between the GNSS and IRS navigation parameter measurements. The output of combiner 508 can be transmitted by differential calculator circuitry 500 for further processing, depending on how the differential value is used to detect GNSS spoofing. In embodiments illustrated by FIG. 3, the output of each of the differential calculator circuits are combined as described above before the combined differential value is compared with a threshold value. In embodiments illustrated by FIG. 4, the output of differential calculator circuit 500 can be directly compared with a threshold value to detect GNSS spoofing.

Figure 6:
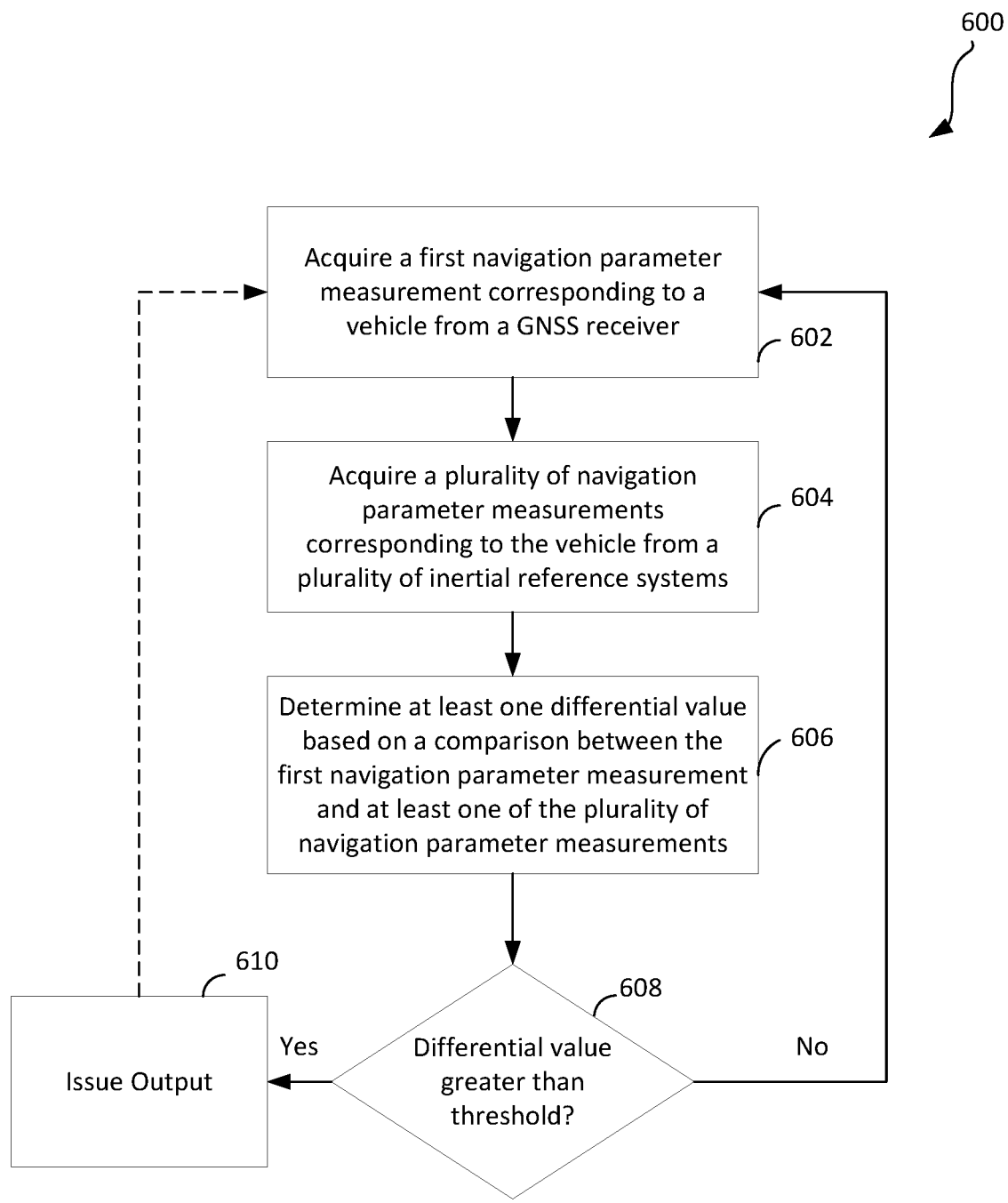
FIG. 6 illustrates a flow chart depicting one example of a process for detecting GNSS spoofing based on a differential value between GNSS data and inertial data.

FIG. 6 illustrates a method for detecting GNSS spoofing based on a differential value between GNSS data and inertial data. The method 600 may be performed using the techniques described above with respect to FIGS. 1-5, but may be implemented via other techniques as well. The blocks of the flow diagram have been arranged in a generally sequential manner for ease of explanation; however, it is to be understood that this arrangement is merely exemplary, and it should be recognized that the processing associated with the system logic described herein (and the blocks shown in the Figures) may occur in a different order (for example, where at least some of the processing associated with the blocks is performed in parallel and/or in an event-driven manner).

Method 600 begins at block 602 by acquiring a first navigation parameter measurement corresponding to a vehicle from a GNSS receiver. The navigation parameter can include measurements or calculations of velocity, position, track angle, flight path angle, groundspeed, or vector components thereof corresponding to a vehicle. In some embodiments, the GNSS receiver can determine the navigation parameter directly, or may send data relating to the navigation parameter to a separate processing system to determine the navigation parameter based on the GNSS data. Also, in some embodiments, a navigation parameter can be acquired from separate GNSS receivers coupled to the vehicle.

Proceeding to block 604 (or completed in parallel with block 602), method 600 acquires a plurality of navigation parameter measurements corresponding to the vehicle from a plurality of inertial reference systems. The plurality of IRS can be configured such that one or more IRS are configured to detect GNSS spoofing from the received GNSS and IRS navigation parameters, or can send the navigation parameters to an external processing system.

At block 606, method 600 then determines at least one differential value based on a comparison between the first navigation parameter measurement and at least one of the plurality of navigation parameter measurements. The at least one differential value corresponds to a rate of change between at least two time periods. For example, the differential value can be calculated as between a first rate of change difference between the first navigation parameter measurements and at least one of the plurality of navigation parameter measurements at a first time period and a second rate of change difference between the first navigation parameter measurement and at least one of the plurality of navigation parameter measurements at a second time period.

In some embodiments, such as those described in FIG. 4, a single differential value is determined. In that case, the at least one navigation parameter measurement corresponds to the combined IRS navigation parameter measurements. That is, the IRS navigation parameter measurements are combined prior to comparison with the GNSS navigation parameter measurement, and the differential value is determined from a rate of change, or difference, between the difference of the GNSS navigation parameter and the combined IRS navigation parameters at the first time period, and the difference of the GNSS navigation parameter and the combined IRS navigation parameters at the second time period. As described above, the plurality of IRS navigation parameters can be combined by determining an average, median, or a weighted average of each of the navigation parameters.

In other embodiments, such as those described in FIG. 3, more than one differential value is determined. Here, the at least one navigation parameter measurement corresponds to one of the IRS navigation parameters, which may be different from another IRS navigation parameter in the plurality of navigation parameter measurements. Each differential value is determined by calculating a difference between a difference of the GNSS navigation parameter and one of the IRS navigation parameters at the first time period, and a difference of the GNSS navigation parameter and the IRS navigation parameters at the second time period. From there, the plurality of differential values can then be combined using any of the techniques described above.

Method 600 proceeds to block 608 by comparing the at least one differential value to a threshold value, wherein the threshold value is indicative of GNSS spoofing with respect to the vehicle. If more than one differential value is determined, the plurality of differential values can be combined before being compared to the threshold value; if only one differential value is determined, it can be directly compared. If the comparison yields a value that exceeds the threshold value, an alert can be issued to a variety of systems as described above. If the at least one differential value is not greater than the threshold, then GNSS spoofing has not occurred, and method 600 can optionally revert back to block 602 and acquire new GNSS and IRS navigation parameter measurements.

If the at least one differential value is greater than the threshold, then GNSS spoofing has occurred with respect to the GNSS navigation parameter measurements. Method 600 then proceeds to block 610 by issuing an appropriate output. In some embodiments, method 600 can issue an alert to one or more systems onboard the vehicle indicating that GNSS spoofing has occurred. Method 600 can also disable use of GNSS navigational aids and switch to an alternative positioning system if available. Alternatively, method 600 can revert back to block 602 and acquire new GNSS and IRS navigation parameter measurements.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as EPROM, EEPROM, and flash memory devices; magnetic disks such as internal hard disks and removable disks;

magneto-optical disks; and DVD disks. Any of the foregoing may be supplemented by, or incorporated in, specially-designed ASICs.

EXAMPLE EMBODIMENTS

Example 1 includes a method, comprising: acquiring a first navigation parameter measurement corresponding to a vehicle from a Global Navigation Satellite System (GNSS) receiver; acquiring a plurality of navigation parameter measurements corresponding to the vehicle from a plurality of inertial reference systems (IRS); determining at least one differential value based on a rate of change of a difference between the first navigation parameter measurement and at least one of the plurality of navigation parameter measurements for at least two points in time; and comparing the at least one differential value to a threshold value, wherein the threshold value is indicative of GNSS spoofing with respect to the vehicle.

Example 2 includes the method of Example 1, wherein determining at least one differential value further comprises: determining a first rate of change difference between the first navigation parameter measurement and the at least one navigation parameter measurement of the plurality of navigation parameter measurements; determining a second rate of change difference between the first navigation parameter measurement and the at least one navigation parameter measurement of the plurality of navigation parameter measurements; and determining a difference between the first rate of change difference and the second rate of change difference.

Example 3 includes the method of Example 2, wherein the first rate of change corresponds to a first time period, wherein the second rate of change corresponds to a second time period, and wherein determining the second rate of change further comprises determining the second rate of change after at least one minute has passed from the first time period.

Example 4 includes the method of any of Examples 1-3, wherein the at least one differential value includes only one differential value, wherein the at least one navigation parameter measurement is based on each of the plurality of navigation parameter measurements, and further comprising combining the plurality of navigation parameter measurements prior to determining the differential value.

Example 5 includes the method of any of Examples 1-4, wherein the at least one differential value comprises a plurality of differential values, wherein the at least one navigation parameter measurement is based on the respective one of the plurality of navigation parameter measurements, and further comprising combining the plurality of differential values to generate a combined differential value.

Example 6 includes the method of any of Examples 1-5, wherein acquiring the first navigation parameter measurement and the plurality of navigation parameter measurements further comprises acquiring one of a velocity, position, groundspeed, track angle, and flight path angle measurement.

Example 7 includes the method of any of Examples 1-6, further comprising issuing an alert to one or more of a ground station, the GNSS receiver, the inertial reference system, or a flight management system in response to the at least one differential value exceeding the threshold value.

Example 8 includes a system comprising, at least one GNSS receiver, wherein the at least one GNSS receiver is configured to acquire a first navigation parameter measurement corresponding to a vehicle based on received GNSS signals; a plurality of inertial reference systems (IRS), wherein the plurality of IRS is configured to acquire a plurality of navigation parameter measurements; and a processing system comprising one or more processors, wherein the processing system is coupled to the GNSS receiver and the plurality of IRS, wherein the processing system is configured to: acquire the first navigation parameter measurement and the plurality of navigation parameter measurements, determine at least one differential value based on a rate of change of a difference between a first navigation parameter measurement and at least one of the plurality of navigation parameter measurements for at least two points in time, and compare the at least one differential value to a threshold value, wherein the threshold value is indicative of GNSS spoofing with respect to the vehicle.

Example 9 includes the system of Example 8, wherein the processing system is integrated in a first IRS of the plurality of IRS, and wherein each of the remaining IRS of the plurality of IRS are coupled to the processing system via the first IRS.

Example 10 includes the system of any of Examples 8-9, wherein to determine at least one differential value further comprises: determine a first rate of change difference between the first navigation parameter measurement and the at least one navigation parameter measurement of the plurality of navigation parameter measurements; determine a second rate of change difference between the first navigation parameter measurement and the at least one navigation parameter measurement of the plurality of navigation parameter measurements; and determine a difference between the first rate of change difference and the second rate of change difference.

Example 11 includes the system of Example 10, wherein the first rate of change corresponds to a first time period, wherein the second rate of change corresponds to a second time period, and wherein the processing system further comprises delay circuitry, wherein the delay circuitry is configured to delay a signal corresponding to the first rate of change difference to the second time period.

Example 12 includes the system of any of Examples 8-11, wherein the at least one differential value includes only one differential value, wherein the at least one navigation parameter measurement is based on each of the plurality of navigation parameter measurements, and wherein the processing system is further configured to combine the plurality of navigation parameter measurements prior to determining the differential value.

Example 13 includes the system of any of Examples 8-12, wherein the at least one differential value comprises a plurality of differential values, wherein the at least one navigation parameter measurement is based on the respective one of the plurality of navigation parameter measurements, and wherein the processing system is further configured to combine the plurality of differential values to generate a combined differential value.

Example 14 includes the system of any of Examples 8-13, wherein the first navigation parameter measurement and the plurality of navigation parameter measurements comprise one of a velocity, position, groundspeed, track angle, and flight path angle measurement.

Example 15 includes the system of any of Examples 8-14, wherein the processing system is further configured to issue an alert to one or more of a ground station, the GNSS receiver, the inertial reference system, or a flight management system in response to the at least one differential value exceeding the threshold value.

Example 16 includes a non-transitory computer-readable medium having computer-executable instructions stored thereon which, when executed by one or more processors, cause the one or more processors to: acquire a first navigation parameter measurement corresponding to a Global Navigation Satellite System (GNSS) receiver; acquire a plurality of navigation parameter measurements corresponding to a plurality of inertial reference systems (IRS); determine at least one differential value based on a rate of change of a difference between a first navigation parameter measurement and at least one of the plurality of navigation parameter measurements for at least two points in time; and compare the at least one differential value to a threshold value, wherein the threshold value is indicative of GNSS spoofing with respect to a vehicle.

Example 17 includes the non-transitory computer-readable medium of Example 16, wherein to determine at least one differential value further comprises: determine a first rate of change difference between the first navigation parameter measurement and the at least one navigation parameter measurement of the plurality of navigation parameter measurements; determine a second rate of change difference between the first navigation parameter measurement and the at least one navigation parameter measurement of the plurality of navigation parameter measurements; and determine a difference between the first rate of change difference and the second rate of change difference.

Example 18 includes the non-transitory computer-readable medium of any of Examples 16-17, wherein the at least one differential value includes only one differential value, wherein the at least one navigation parameter measurement is based on each of the plurality of navigation parameter measurements, and wherein the instructions further cause the one or more processors to combine the plurality of navigation parameter measurements prior to determining the differential value.

Example 19 includes the non-transitory computer-readable medium of any of Examples 16-18, wherein the at least one differential value comprises a plurality of differential values, wherein the at least one navigation parameter measurement is based on the respective one of the plurality of navigation parameter measurements, and wherein the instructions further cause the one or more processors to combine the plurality of differential values to generate a combined differential value.

Example 20 includes the non-transitory computer-readable medium of any of Examples 16-19, wherein the instructions further cause the one or more processors to issue an alert to one or more of a ground station, the GNSS receiver, the inertial reference system, or a flight management system in response to the at least one differential value exceeding the threshold value.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method, comprising:
    acquiring a first navigation parameter measurement corresponding to a vehicle from a Global Navigation Satellite System (GNSS) receiver;
    acquiring a plurality of navigation parameter measurements corresponding to the vehicle from a plurality of inertial reference systems (IRS);
    determining at least one differential value based on a rate of change of a difference between the first navigation parameter measurement corresponding to the GNSS receiver and at least one of the plurality of navigation parameter measurements from the plurality of IRS, for at least two points in time; and
    comparing the at least one differential value to a threshold value, wherein the threshold value is indicative of GNSS spoofing with respect to the vehicle.

2. The method of claim 1, wherein determining at least one differential value further comprises:
    determining a first rate of change difference between the first navigation parameter measurement and the at least one navigation parameter measurement of the plurality of navigation parameter measurements;
    determining a second rate of change difference between the first navigation parameter measurement and the at least one navigation parameter measurement of the plurality of navigation parameter measurements; and
    determining a difference between the first rate of change difference and the second rate of change difference.

3. The method of claim 2, wherein the first rate of change corresponds to a first time period, wherein the second rate of change corresponds to a second time period, and wherein determining the second rate of change further comprises determining the second rate of change after at least one minute has passed from the first time period.

4. The method of claim 1, wherein the at least one differential value includes only one differential value, wherein the at least one navigation parameter measurement is based on each of the plurality of navigation parameter measurements, and further comprising combining the plurality of navigation parameter measurements prior to determining the differential value.

5. The method of claim 1, wherein the at least one differential value comprises a plurality of differential values, wherein the at least one navigation parameter measurement is based on a respective one of the plurality of navigation parameter measurements, and further comprising combining the plurality of differential values to generate a combined differential value.

6. The method of claim 1, wherein acquiring the first navigation parameter measurement and the plurality of navigation parameter measurements further comprises acquiring one of a velocity, position, groundspeed, track angle, and flight path angle measurement.

7. The method of claim 1, further comprising issuing an alert to one or more of a ground station, the GNSS receiver, the inertial reference system, or a flight management system in response to the at least one differential value exceeding the threshold value.

8. A system comprising,
    at least one GNSS receiver, wherein the at least one GNSS receiver is configured to acquire a first navigation parameter measurement corresponding to a vehicle based on received GNSS signals;
    a plurality of inertial reference systems (IRS), wherein the plurality of IRS is configured to acquire a plurality of navigation parameter measurements; and
    a processing system comprising one or more processors, wherein the processing system is coupled to the GNSS receiver and the plurality of IRS, wherein the processing system is configured to:
        acquire the first navigation parameter measurement and the plurality of navigation parameter measurements,
        determine at least one differential value based on a rate of change of a difference between a first navigation parameter measurement corresponding to the at least one GNSS receiver and at least one of the plurality of navigation parameter measurements for at least two points in time from the plurality of IRS, and compare the at least one differential value to a threshold value, wherein the threshold value is indicative of GNSS spoofing with respect to the vehicle.

9. The system of claim 8, wherein the processing system is integrated in a first IRS of the plurality of IRS, and wherein each of the remaining IRS of the plurality of IRS are coupled to the processing system via the first IRS.

10. The system of claim 8, wherein to determine at least one differential value further comprises:

determine a first rate of change difference between the first navigation parameter measurement and the at least one navigation parameter measurement of the plurality of navigation parameter measurements;

determine a second rate of change difference between the first navigation parameter measurement and the at least one navigation parameter measurement of the plurality of navigation parameter measurements; and determine a difference between the first rate of change difference and the second rate of change difference.

11. The system of claim 10, wherein the first rate of change corresponds to a first time period, wherein the second rate of change corresponds to a second time period, and wherein the processing system further comprises delay circuitry, wherein the delay circuitry is configured to delay a signal corresponding to the first rate of change difference to the second time period.

12. The system of claim 8, wherein the at least one differential value includes only one differential value, wherein the at least one navigation parameter measurement is based on each of the plurality of navigation parameter measurements, and wherein the processing system is further configured to combine the plurality of navigation parameter measurements prior to determining the differential value.

13. The system of claim 8, wherein the at least one differential value comprises a plurality of differential values, wherein the at least one navigation parameter measurement is based on a respective one of the plurality of navigation parameter measurements, and wherein the processing system is further configured to combine the plurality of differential values to generate a combined differential value.

14. The system of claim 8, wherein the first navigation parameter measurement and the plurality of navigation parameter measurements comprise one of a velocity, position, groundspeed, track angle, and flight path angle measurement.

15. The system of claim 8, wherein the processing system is further configured to issue an alert to one or more of a ground station, the GNSS receiver, the inertial reference system, or a flight management system in response to the at least one differential value exceeding the threshold value.

16. A non-transitory computer-readable medium having computer-executable instructions stored thereon which, when executed by one or more processors, cause the one or more processors to:

acquire a first navigation parameter measurement corresponding to a Global Navigation Satellite System (GNSS) receiver;

acquire a plurality of navigation parameter measurements corresponding to a plurality of inertial reference systems (IRS);

determine at least one differential value based on a rate of change of a difference between a first navigation parameter measurement corresponding to the GNSS receiver and at least one of the plurality of navigation parameter measurements from the plurality of IRS for at least two points in time; and compare the at least one differential value to a threshold value, wherein the threshold value is indicative of GNSS spoofing with respect to a vehicle.

17. The non-transitory computer-readable medium of claim 16, wherein to determine at least one differential value further comprises:

determine a first rate of change difference between the first navigation parameter measurement and the at least one navigation parameter measurement of the plurality of navigation parameter measurements;

determine a second rate of change difference between the first navigation parameter measurement and the at least one navigation parameter measurement of the plurality of navigation parameter measurements; and determine a difference between the first rate of change difference and the second rate of change difference.

18. The non-transitory computer-readable medium of claim 16, wherein the at least one differential value includes only one differential value, wherein the at least one navigation parameter measurement is based on each of the plurality of navigation parameter measurements, and wherein the instructions further cause the one or more processors to combine the plurality of navigation parameter measurements prior to determining the differential value.

19. The non-transitory computer-readable medium of claim 16, wherein the at least one differential value comprises a plurality of differential values, wherein the at least one navigation parameter measurement is based on the respective one of the plurality of navigation parameter measurements, and wherein the instructions further cause the one or more processors to combine the plurality of differential values to generate a combined differential value.

20. The non-transitory computer-readable medium of claim 16, wherein the instructions further cause the one or more processors to issue an alert to one or more of a ground station, the GNSS receiver, the inertial reference system, or a flight management system in response to the at least one differential value exceeding the threshold value.

\* \* \* \* \*